United States Patent [19]

Germany

[11] 3,823,314
[45] July 9, 1974

[54] LAMP ASSEMBLIES
[75] Inventor: Michael John Germany, Lichfield, England
[73] Assignee: The Lucas Electrical Company Limited, Birmingham, England
[22] Filed: June 13, 1973
[21] Appl. No.: 369,546

[30] Foreign Application Priority Data
June 13, 1972  Great Britain..................... 27537/72

[52] U.S. Cl............ 240/41.6, 240/7.1 R, 240/52 R, 240/DIG. 5, 403/74
[51] Int. Cl. ............................................... F21v 7/00
[58] Field of Search.............. 240/41.6, 52 R, 7.1 R, 240/8.1 R, DIG. 5; 248/27; 403/74, 59

[56]  References Cited
UNITED STATES PATENTS

| 2,266,329 | 12/1941 | Mead et al................. | 240/41.6 X |
| 2,826,682 | 3/1958 | Falge ........................ | 240/41.6 X |
| 2,911,523 | 11/1959 | Falge et al.................. | 240/41.6 |
| 3,062,489 | 11/1962 | Zook........................... | 240/41.6 X |
| 3,385,546 | 5/1968 | Scowen...................... | 240/41.6 X |
| 3,502,862 | 3/1970 | Hedgewick et al. ......... | 240/41.6 X |
| 3,710,097 | 1/1973 | Bright et al.................. | 240/41.6 |
| 3,735,121 | 5/1973 | Jaeger........................ | 240/41.6 |

Primary Examiner—Richard L. Moses
Attorney, Agent, or Firm—Holman & Stern

[57]  ABSTRACT

A lamp assembly comprises a lamp unit, a support member for attachment to a motor vehicle, and a pair of spaced adjustment devices for adjusting the position of the lamp unit relative to the support member. The lamp unit is also connected with the support member by a pivot assembly so that adjustment of either adjustment device causes the lamp unit to be moved relative to the support member about an axis which passes through the pivot assembly and the other adjustment device. Each adjustment device comprises a flange secured to the lamp unit, a coupling member snap-fitted into a slot in the flange, and a screw-threaded shank having a ball engaged as a snap-fit in a socket on the coupling member. The shank is screw-threaded into a nut secured to the support member so that rotation of the shank relative to the nut causes adjustment of the lamp unit relative to the support member.

6 Claims, 6 Drawing Figures

3,823,314

LAMP ASSEMBLIES

This invention relates to lamp assemblies for road vehicles.

A lamp assembly according to the invention includes a lamp unit, a support member, and means securing the lamp unit to the support member, the securing means affording adjustment of the orientation of the lamp unit relative to the support member and including a first screw-threaded part carried by the support member, a second screw threaded part in screw-threaded engagement with the first part and rotatable relative thereto, a flange secured to the lamp unit and having therein a slot open at one edge of the flange, the flange extending generally perpendicular to the axis of said second screw threaded part, a coupling member extending through said slot and having respective surfaces engaging opposite faces of the flange so as to prevent movement of the coupling member relative to the flange in a direction perpendicular to the flange, means resisting movement of the coupling member along the length of the slot in the flange, a part-spherical recess in the portion of the coupling member presented to the support member and a part-spherical end portion on the second screw-threaded part, the part-spherical end portion being received as a snap-fit in the recess of the coupling member and the part-spherical end portion and the recess defining a ball-and-socket connection between the support member and the lamp unit.

Preferably, a pair of opposite edges of the flange are bent to extend at right angles to the plane of the flange, so as to define a channel presented away from the support member, the surface of the coupling member which engages the face of the flange remote from the support member being a surface of a head of the coupling member which is received in said channel, the head of the coupling member and the wall of the channel serving to resist rotation of the coupling member relative to the flange.

Conveniently, said means resisting movement of the coupling member along the length of the slot includes a projecting portion on the wall of the slot between the open and closed ends of the slot whereby the width of the slot intermediate its closed end and its open end is reduced, the coupling member having a portion between said surfaces which is engaged as a snap fit in the region of the slot adjacent the closed end of the slot by urging the coupling member along the length of the slot, in use, beyond said region of the slot of reduced width.

Desirably the flange is cranked so that the region of the flange containing the slot lies nearer to the support member than the point of interconnection between the flange and the lamp unit.

One example of the invention is illustrated in the accompanying drawings wherein.

Figure 1:
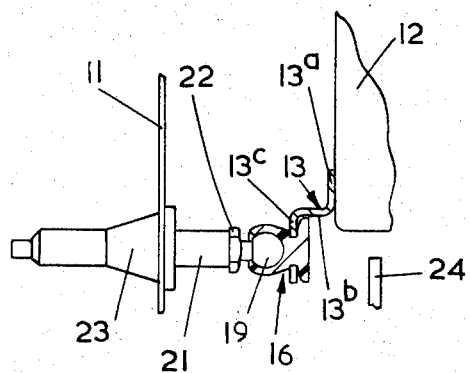
FIG. 1 is a part sectional representation of part of a lamp assembly.
Figure 2:
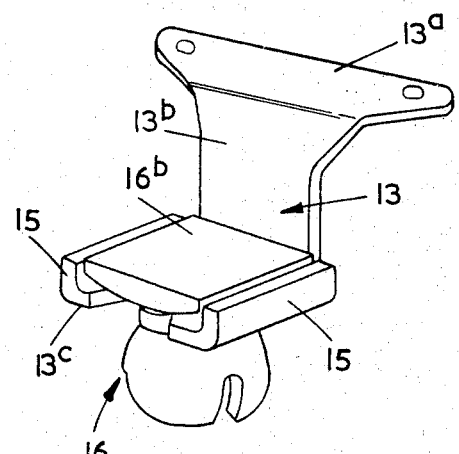
FIG. 2 is a perspective view to an enlarged scale of part of the assembly shown in FIG. 1.
Figure 3:
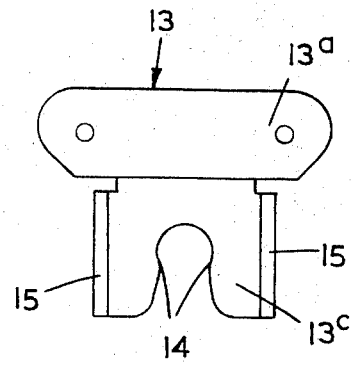
FIG. 3 is a plan view of the flange shown in FIG. 2.
Figure 4:
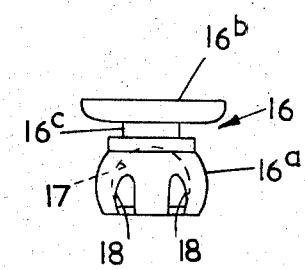
FIG. 4 is a side elevational view of the coupling member shown in FIG. 2.

Referring to the drawings, the lamp assembly includes a support member 11 which is arranged, in this embodiment, to be secured to the body of a road vehicle, but which may be an integral part of the body of the road vehicle, and a pair of rectangular lamp units 12 (only one shown) which may for example be a sealed beam unit. This invention is also applicable to lamp assemblies provided with a single lamp unit. Hereafter, the assembly will be described as if there were only one unit 12.

Secured to the lamp unit 12 in any convenient manner and extending from a pair of diagonally opposite corners thereof are a pair of substantially identical flanges 13, one of which is shown in FIG. 1. Each flange 13 includes a first portion 13a secured to the lamp unit 12, a second portion 13b extending at right angles to the portion 13a, and a third portion 13c extending from the portion 13b in the opposite direction to the portion 13a, but parallel with the portion 13a. The portion 13c of the flange is formed with a slot which extends from the free end of the portion 13c towards the portion 13b, the slot having a pair of projections 14 on opposite edges of the slot and intermediate the ends of the slot whereby the width of the slot is reduced intermediate the ends thereof. The longitudinally extending edge regions of the portion 13c of the flange are bent to define a pair of upstanding walls 15, the walls 15 and the remainder of the portion 13c defining a channel extending towards the portion 13b the channel being presented towards the lamp unit 12.

Engaged with the flange 13 is a moulded synthetic resin coupling piece 16 the coupling piece 16 consisting of a hollow body portion 16a and a rectangular head 16b interconnected by an integral cylindrical neck 16c. The dimensions of the rectangular head 16b are substantially equal to the internal dimensions of the channel of the flange portion 13c and the axial length of the cylindrical neck 16c is substantially equal to the thickness of the portion 13c of the flange 13. The head 16b and the body 16a of the coupling piece 16 define mutually presented surfaces which engage opposite sides of the portion 13c of the flange respectively, the neck 16c extending through the slot in the flange portion 13c and being disposed adjacent the closed end of the slot. The coupling piece 16 is engaged with the flange 13 by aligning the head 16b with the channel defined by the flange portion 13c, and then inserting the neck 16c into the slot in the flange portion 13 c from the open end of the slot and sliding the coupling piece along the length of the slot. The width of the narrowed region of the slot is less than the diameter of the neck 16c and the neck 16c is moved to its final position by forcing the neck 16c beyond the narrowed region of the slot, by virtue of the resilience of the coupling piece and the flange portion 13c. Thus, the coupling piece 16 is engaged as a snap-fit with the flange 13, engagement of a pair of opposite edges of the walls 16b with the walls 15 preventing rotation of the coupling piece in use relative to the flange, the abutment of the surfaces of the head 16b and the body 16a with opposite surfaces of the flange portion 13c preventing movement of the coupling piece relative to the flange in a direction at right angles to the flange, and the narrowed region of the slot resisting disengagement of the coupling piece from the flange 13 along the length of the slot.

The body 16a of the coupling piece 16 is formed with a part-spherical recess 17, the majority of the body 16a being also part-spherical so that the recess has a substantially constant wall thickness. The recess 17 is open at the end of the body remote from the head 16b, and extending from the open end of the body towards the head 16b are three equiangularly spaced slots 18 which divide the wall of the recess into three equiangularly spaced resilient fingers.

Engaged as a snap-fit in the recess 17 of the coupling piece 16 is a part-spherical end portion 19 of a screw-threaded shank 21. Adjacent the portion 19, the crew threaded shank 21 is formed with a hexagonal flange 22 for receiving a spanner. The screw-threaded region of the shank 21 is screw-threadedly engaged with a nut 23 secured to the support member 11. The shank 21 extends at right angles to the support member 11, and rotation of the shank relative to the nut 23 moves the flange 13 towards or away from the support member 11, the end portion 19 of the shank and the body 16a of the connecting piece 16 defining a ball-and-socket connection between the lamp units 12 and the support member 11.

Figure 5:
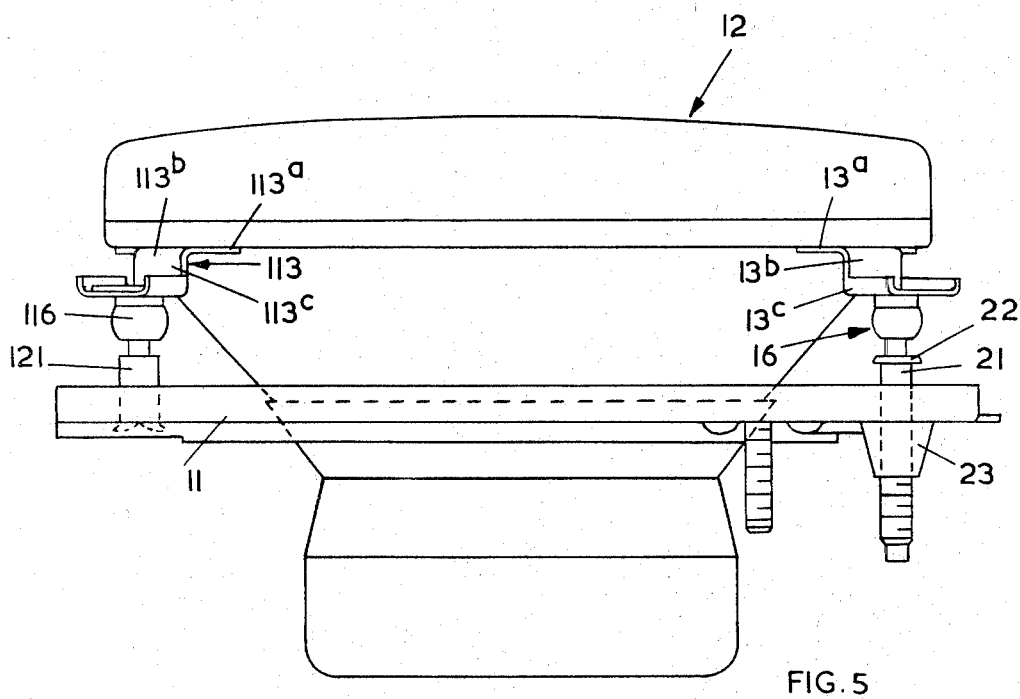
FIG. 5 is a plan view of the lamp assembly.
Figure 6:
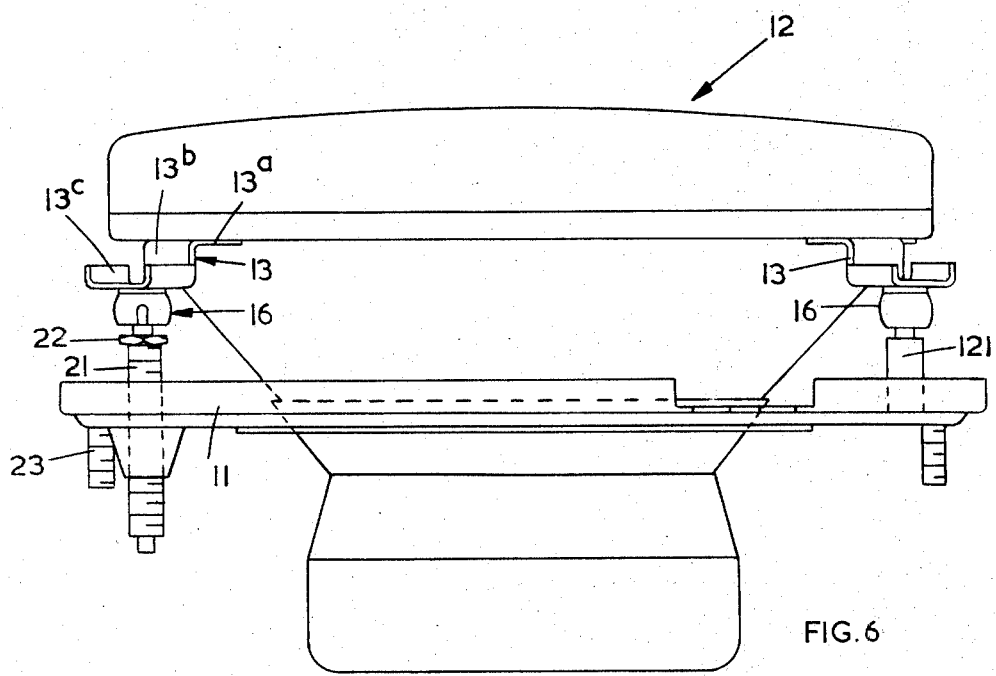
FIG. 6 is an end view of the lamp assembly.

As described above, the lamp unit is provided with a second flange diagonally opposite the flange 13 the second flange is substantially identical with the flange 13 and receives a substantially identical connecting piece (see FIGS. 5 and 6). A second screw-threaded shank is similarly engaged with the second connecting piece and a second nut carried by the support member. One of the other pair of diagonally opposite corners of the lamp unit is connected to the support member through a pivot assembly including a flange 113 which is identical to flange 13, a coupling piece 116 which is identical to coupling piece 16, and a shank 121 which is similar to shank 121 but which is fixedly secured instead of rotatably mounted, relative to the support member at the coupling piece remote end of the shank 121 (see FIGS. 5 and 6). The lamp is arranged, in use, with the diagonal of the lamp which passes through the flanges 13 positioned at 45° to the horizontal. Thus, rotation of either of the screw-threaded shanks 21 will result in movement of the lamp unit relative to the support member about an axis passing through the other screw-threaded shank 21 and the shank 121. In this manner, the orientation of the lamp unit relative to the support member and therefore the body of the vehicle can be adjusted about both horizontal and vertical axes.

While the lamp unit described above is rectangular it is to be appreciated that a more conventional circular lamp unit could be used in exactly the same manner. Furthermore, the lamp unit need not be of the sealed beam type, and could be of the type having a replaceable bulb.

The support member 11 is inset into the body of the vehicle, while the lens of the lamp unit 12 is substantially flush with the frontal surface of the vehicle. Thus, a gap is defined between the support member 11 and the front surface of the vehicle bodywork 24 (FIG. 1). The bodywork 24 overlies the flange 13 and 113 of the lamp, and so masks the flanges 13 and 113 from view from the front of the vehicle. The flanges 13 and 113 are stepped towards the support member 11 by virtue of their regions 13b and 113b respectively, to afford the maximum clearance between the flange 13 and 113 and the bodywork 24 in one direction and the flange 13 and 113 and the support member 11 in the other direction, thereby ensuring an adequate range of adjustment in both directions from a mean position wherein the lamp unit is generally parallel with the support member 11. In order to preserve the maximum range of adjustment the clearance between the flange 13, 113 and the bodywork 24 is maintained as great as possible by the arrangement whereby the coupling piece 16, 116 is secured to the flange 13, 113. It will be appreciated that the head 16b of the coupling piece, by virtue of its flat and relatively thin nature occupies a minimum of the space available between the flange 13 and the bodywork 24.

As previously stated, the part-spherical end portion 19 of the shank 21 is engaged as a snap-fit in the recess 17 of the connecting piece 16. The substantially constant wall thickness of the recess 17 facilitates the snap-fit engagement of the portion 19 in the recess 17 since by ensuring substantially constant wall thickness the fingers defined by the slots 18 can flex equally along substantially the whole of their length.

I claim:

1. A lamp assembly comprising a lamp unit, a support member, and means securing the lamp unit to the support member, said means affording adjustment of the orientation of the lamp unit relative to the support member and including a first screw-threaded part carried by the support member, a second screw-threaded part in screw-threaded engagement with the first part and rotatable relative thereto, a flange secured to the lamp unit and having therein a slot open at one edge of the flange, the flange extending generally perpendicularly to the axis of said second screw-threaded part, a coupling member extending through said slot and having respective surfaces engaging opposite faces of the flange so as to prevent movement of the coupling member relative to the flange in a direction perpendicular to the flange, means resisting movement of the coupling member along the length of the slot in the flange, a part-spherical recess in a portion of the coupling member presented to the support member, and a part-spherical end portion on the second screw-threaded part, the part-spherical end portion being received as a snap-fit in the recess of the coupling member and the part-spherical end portion and the recess defining a ball-and-socket connection between the support member and the lamp unit.

2. A lamp assembly as claimed in claim 1, wherein a pair of opposite edges of the flange are bent to extend at right angles to the plane of the flange, so as to define a channel presented away from the support member, the surface of the coupling member which engages the face of the flange remote from the support member being a surface of a head of the coupling member which is received in said channel, the head of the coupling member and the wall of the channel serving to resist rotation of the coupling member relative to the flange.

3. A lamp assembly as claimed in claim 1, wherein said means resisting movement of the coupling member along the length of the slot includes a projecting portion on the wall of the slot between the open and closed ends of the slot whereby the width of the slot intermediate its closed end and its open end is reduced, the coupling member having a portion between said surfaces which is engaged as a snap-fit in the region of the slot adjacent the closed end of the slot by urging the coupling member along the length of the slot, in use, beyond said region of the slot of reduced width.

4. A lamp assembly as claimed in claim 1, wherein the flange is positioned so that the region of the flange containing the slot lies nearer to the support member than the point of interconnection between the flange and the lamp unit.

5. A lamp assembly as claimed in claim 1, wherein a pair of the said securing means are provided for adjustably securing the lamp unit to the support member, and a pivot assembly also pivotally secures the lamp unit to the support member, the arrangement of the pair of securing means and the pivot assembly being such that adjustment of either of the securing means causes movement of the lamp unit relative to the support member about an axis passing through the other securing means and the pivot assembly.

6. A lamp assembly as claimed in claim 5, wherein the pivot assembly includes a ball-and-socket connection.

* * * * *